(12) United States Patent
Boussant-Roux et al.

(10) Patent No.: US 8,168,554 B2
(45) Date of Patent: *May 1, 2012

(54) PARTICLE OF A MOLTEN CERAMIC MATERIAL

(75) Inventors: Yves Boussant-Roux, Montfavet (FR); Emmanuel Nonnet, Sarrians (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 158 days.

This patent is subject to a terminal disclaimer.

(21) Appl. No.: 12/444,065

(22) PCT Filed: Oct. 11, 2007

(86) PCT No.: PCT/FR2007/052127
§ 371 (c)(1),
(2), (4) Date: Apr. 2, 2009

(87) PCT Pub. No.: WO2008/043966
PCT Pub. Date: Apr. 17, 2008

(65) Prior Publication Data
US 2010/0016145 A1    Jan. 21, 2010

(30) Foreign Application Priority Data

Oct. 13, 2006 (FR) ...................................... 06 54276

(51) Int. Cl.
*C04B 35/48* (2006.01)
*C09K 3/14* (2006.01)
(52) U.S. Cl. ............. 501/104; 51/307; 51/309; 51/293; 501/103; 501/105
(58) Field of Classification Search ............ *C04B 35/48*
See application file for complete search history.

(56) References Cited

U.S. PATENT DOCUMENTS

| | | | |
|---|---|---|---|
| 4,106,947 A | 8/1978 | Recasens et al. | |
| 4,450,184 A | 5/1984 | Longo et al. | |
| 5,468,427 A | 11/1995 | Stangle et al. | |
| 5,502,012 A * | 3/1996 | Bert et al. ...................... | 501/103 |
| 5,922,801 A | 7/1999 | Bailey et al. | |
| 6,335,083 B1 | 1/2002 | Kasai et al. | |
| 6,797,203 B2 | 9/2004 | Vlach et al. | |
| 7,811,496 B2 | 10/2010 | Celikkaya et al. | |
| 2010/0016145 A1 | 1/2010 | Boussant-Roux et al. | |

FOREIGN PATENT DOCUMENTS

| | | |
|---|---|---|
| EP | 0 662 461 A1 | 7/1995 |
| FR | 2 320 276 | 3/1977 |
| JP | A-60-243245 | 12/1985 |
| WO | WO 01/23324 A1 | 4/2001 |
| WO | WO 2008/043966 A2 | 4/2008 |

OTHER PUBLICATIONS

May 18, 2011 Office Action for U.S. Appl. No. 12/936,687.
Jun. 4, 2010 Written Opinion of the International Searching Authority issued in International Application No. PCT/FR2009/050589, (with English-language translation).
Jun. 4, 2010 International Search Report issued in International Application No. PCT/FR2009/050589, (with English-language translation).
Sep. 30, 2011 Office Action issued in U.S. Appl. No. 12/936,687.

* cited by examiner

*Primary Examiner* — Jerry Lorengo
*Assistant Examiner* — Jared Wood
(74) *Attorney, Agent, or Firm* — Oliff & Berridge, PLC

(57) ABSTRACT

The invention relates to a molten ceramic particle, characterized in that it has the following chemical composition in wt % based on oxides and for a total of 100%: 55%<$ZrO_2$+$HfO_2$<70%; 20%<$SiO_2$<30%; 6.5%<MgO<9.5%; $Al_2O_3$ in an amount such that the mass ratio MgO/$Al_2O_3$ is comprised between 2.4 and 6.6; and less than 0.6% of other oxides.

14 Claims, No Drawings

PARTICLE OF A MOLTEN CERAMIC MATERIAL

The present invention relates to novel particles, especially in the form of beads, made of fused ceramic, to a process for manufacturing these beads, and to the use of these particles as grinding agents, agents for dispersion in a wet medium, or for surface treatment.

The mineral industry uses beads for the fine grinding of materials that have been pre-ground in the dry state using conventional processes, especially for calcium carbonate, titanium oxide, gypsum, kaolin and iron ore.

The paint, ink, dye, magnetic enamel, and agrochemical compound industries uses such beads for dispersing and homogenizing various liquid and solid constituents.

Finally, the surface treatment industry uses these particles or beads, in particular in operations for cleaning metallic moulds (for manufacturing bottles for example), deburring parts, descaling, preparing a support with a view to coating it, shot peening, peen forming, etc.

Conventionally, the particles are approximately spherical and have a size of 0.1 to 4 mm in order to serve all the markets described above. So that they can be used in these three types of applications, they must in particular have the following properties:
- chemical and colour inertness with respect to the products treated;
- mechanical impact strength;
- wear resistance;
- low abrasiveness to the equipment, especially the stirrer members and the tanks, or the spraying members; and
- low open porosity for easy cleaning.

Various types of particles, particularly beads, are found on the market, especially in the field of microgrinding:
- sand with rounded grains, such as Ottawa sand for example, is a natural and cheap product but unsuitable for modern, pressurized and high-throughput mills. This is because the sand is not very strong, has a low density, varies in quality and is abrasive to the equipment;
- glass beads, which are widely used, have a better strength, a lower abrasiveness and are available in a wider range of diameters; and
- metallic beads, especially ones made of steel, have insufficient inertness with respect to the products treated, in particular leading to pollution of mineral fillers and greying of paints, and have a density that is too high requiring special mills which results, in particular, in a high energy consumption, significant heating and high mechanical stressing of the equipment.

Beads made of a ceramic material are also known. These beads have a better strength than glass beads, a higher density and excellent chemical inertness. The following may be distinguished:
- sintered ceramic beads, obtained by cold forming a ceramic powder and then consolidation by firing at high temperature; and
- so-called "fused" ceramic beads, generally obtained by melting ceramic components, forming spherical drops from the molten material, then solidifying said drops.

The great majority of fused beads have a zirconia/silica ($ZrO_2/SiO_2$) type composition where the zirconia is crystallized in monoclinic form and/or partially stabilized (by suitable additions), and the silica and also some of the optional additives form a glassy phase binding the zirconia crystals. The fused ceramic beads offer optimum properties for grinding, namely good mechanical strength, high density, chemical inertness and low abrasiveness with respect to the grinding equipment.

Fused ceramic beads based on zirconia and their use for grinding and dispersion are, for example, described in FR 2 320 276 et EP 0 662 461. These documents describe the effect of $SiO_2$, $Al_2O_3$, MgO, CaO, $Y_2O_3$, $CeO_2$, and $Na_2O$ on the main properties, especially on the compressive strength and abrasion resistance properties.

Although the fused ceramic beads of the prior art are of good quality, industry always needs products of even better quality. This is because the grinding conditions are becoming more and more demanding and it is necessary, in order to reduce the production costs, to increase the yields of the machines used. In particular, it is desirable to reduce the downtime of these machines.

The invention aims to meet these needs by providing fused ceramic particles which, besides the required qualities mentioned above, have an improved fracture resistance.

More specifically, the invention relates to a novel fused ceramic particle, preferably in the form of a bead, having the following chemical composition, as weight percentages based on the oxides, and for a total of 100%:
- 55%<$ZrO_2$+$HfO_2$<70%;
- 20%<$SiO_2$<30%;
- 6.5%<MgO<9.5%;
- $Al_2O_3$ in an amount such that the MgO/$Al_2O_3$ weight ratio is between 2.4 and 6.6; and
- less than 0.6% of other oxides.

The inventors have found, unexpectedly, that the presence of magnesia (MgO) and alumina ($Al_2O_3$) in amounts such that the MgO/$Al_2O_3$ weight ratio is between 2.4 and 6.6 significantly improves the properties of the fused ceramic particles, especially in comparison with particles containing these two oxides in a different ratio such as those described in FR 2 320 276. In particular, particles are obtained that have better fracture resistance during use.

The particles according to the invention are thus particularly well suited to applications of dispersion in a wet medium, microgrinding and surface treatment. In the grinding application, the particles according to the invention have an improved fracture resistance at the start and during use.

Except where mentioned otherwise, all the percentages are weight percentages expressed as a percentage relative to the total weight of the oxides.

Preferably, the particle according to the invention has at least one, and preferably several of the following optional characteristics:
- the oxide content of a particle according to the invention represents more than 99.5%, preferably more than 99.9%, and more preferably approximately 100% of the total weight of said particle;
- the fused ceramic particle according to the invention comprises an amount, by weight, of $ZrO_2$ greater than or equal to 58.9%, preferably greater than or equal to 60%, preferably greater than or equal to 60.7%, and/or less than or equal to 69.5%, preferably less than or equal to 68%, preferably less or equal to 65%, more preferably less than or equal to 62%, preferably less than or equal to 61.2%. More preferably, this amount is approximately equal to 60.8%;
- the fused ceramic particle according to the invention comprises an amount, by weight, of $SiO_2$ greater than or equal to 22%, preferably greater than or equal to 25%, more preferably greater than or equal to 27%, preferably greater than or equal to 28%, and/or less than or equal to 29%, preferably less than or equal to 28.5%. More preferably, this amount is approximately equal to 28.3%;

the fused ceramic particle according to the invention comprises an amount, by weight, of MgO greater than or equal to 8%, preferably greater than or equal to 8.3%, and/or less than or equal to 9%, preferably less than or equal to 8.8%. More preferably, this amount is approximately equal to 8.6%;

the fused ceramic particle according to the invention comprises an amount, by weight, of $Al_2O_3$ greater than or equal to 1.2%, preferably greater than or equal to 1.4%, and/or less than or equal to 3.2%, preferably less than or equal to 2.5%, preferably less than or equal to 2%. More preferably, this amount is approximately equal to 1.9%;

the fused ceramic particle according to the invention has a $MgO/Al_2O_3$ weight ratio greater than 3, preferably greater than 3.7, preferably greater than 4.2, and/or less than or equal to 6, preferably less than or equal to 5.5, preferably less than 5. Preferably, the $MgO/Al_2O_3$ weight ratio is approximately 4.6;

the "other oxides" are only present in the form of impurities. It is considered that a total content of "other oxides" less than 0.6% does not substantially modify the results obtained. However, preferably, they represent less than 0.5%, preferably less than 0.45% of the total weight of oxides of the fused ceramic particle according to the invention.

the fused ceramic particle according to the invention has a size less than 4 mm and/or greater than 0.1 mm;

a preferred particle according to the invention has the following chemical composition, as weight percentages based on the oxides, and for a total of 100%:
60%<$ZrO_2$+$HfO_2$<62%;
27%<$SiO_2$<29%;
8%<MgO<9%;
$Al_2O_3$ in an amount such that the $MgO/Al_2O_3$ weight ratio is between 4.2 and 5; and
less than 0.5% of other oxides; and the particle according to the invention is preferably in the form of a bead.

The invention also relates to a set of particles comprising more than 90%, preferably more than 95%, preferably around 100%, in percentages by weight, of particles according to the invention.

The term "bead" is understood to mean a particle that has a sphericity, that is to say a ratio between its smallest and its largest diameter, less than or equal to 0.6, regardless of the way in which this sphericity was obtained. Preferably, the beads according to the invention have a sphericity greater or equal to 0.7.

The expression "fused bead" or more commonly "fused particle" is understood to mean a solid bead (or particle) obtained by solidifying a composition in the liquid state.

The "size" of a bead (or particle) refers to the average of its largest dimension dM and of its smallest dimension dm: (dM+dm)/2.

The term "impurities" is understood to mean the inevitable constituents necessarily introduced with the raw materials. In particular, the compounds that make up part of the group of oxides, nitrides, oxynitrides, carbides, oxycarbides, carbonitrides and metallic species of sodium and other alkali metals, iron, silicon, vanadium and chromium are impurities. As examples, mention may be made of CaO, $Fe_2O_3$ or $Na_2O$. The residual carbon makes up part of the impurities of the composition of the particles according to the invention. On the other hand, hafnium oxide is not considered as an impurity. Preferably, $Y_2O_3$ and $CeO_2$ are impurities. In particular, preferably $Y_2O_3$<0.2% and $CeO_2$<0.6%. The $Y_2O_3$ content may even be less than 0.1%, or even less than 0.05%, and the $CeO_2$ content may even be less than 0.5%, as weight percentages based on the oxides.

When reference is made to $ZrO_2$, it should be understood as ($ZrO_2$+$HfO_2$). This is because a small amount of $HfO_2$, which cannot be chemically separated from $ZrO_2$ and which has similar properties, is always naturally present in zirconia sources at contents less than 2%.

The invention also relates to a process for manufacturing fused particles according to the invention, especially fused beads, comprising the following successive steps;
a) mixing raw materials to form a starting feedstock;
b) melting the starting feedstock until a molten liquid is obtained; and
c) dispersing the molten liquid in the form of liquid droplets and solidifying these liquid droplets in the form of solid particles (especially beads).

According to the invention, the raw materials are chosen in step a) so that the particles obtained in step c) are according to the invention.

In step a), the starting feedstock is formed from the oxides indicated or precursors of these. Preferably, a natural zircon sand ($ZrSiO_4$) containing around 66% of $ZrO_2$ and 33% of $SiO_2$, plus impurities, is used. The provision of $ZrO_2$ via the zircon is indeed much more economical than an addition of $ZrO_2$.

Adjustment of the compositions may be carried out by addition of pure oxides or mixtures of oxides, especially $ZrO_2$, $SiO_2$, MgO and $Al_2O_3$.

According to the invention, a person skilled in the art adjusts the composition of the starting feedstock so as to obtain, at the end of step c), particles according to the invention. Chemical analysis of the fused ceramic particles according to the invention is generally approximately identical to that of the starting feedstock. Moreover, where appropriate, for example in order to take into account the presence of volatile oxides, or to take into account the loss of $SiO_2$ when melting is carried out under reducing conditions, a person skilled in the art knows how to adapt the composition of the starting feedstock accordingly.

Preferably, no oxide other than $ZrO_2$+$HfO_2$, $SiO_2$, MgO and $Al_2O_3$ is intentionally introduced into the starting feedstock, the other oxides present being impurities.

Preferably, $Y_2O_3$ and $CeO_2$ are impurities.

In step b), the starting feedstock is melted, preferably in an electric arc furnace. This is because electrofusion allows the manufacture of large amounts of particles (preferably in the form of beads) with advantageous yields. However, all known furnaces can be envisaged, such as an induction furnace or a plasma furnace, so long as they enable the starting feedstock to be completely melted.

In step c), a stream of molten liquid is dispersed into small liquid droplets which, as a result of the surface tension, take, for the majority of them, an approximately spherical shape. This dispersion may be carried out by blowing, especially with air and/or water vapour or by any other process for spraying a molten material, known to a person skilled in the art. A fused ceramic particle having a size of 0.1 to 4 mm can thus be produced.

The cooling resulting from the dispersion leads to the solidification of the liquid droplets. Thus, solid particles, especially beads, according to the invention are obtained.

Any conventional process for manufacturing fused particles, especially fused beads, may be used, so long as the composition of the starting feedstock makes it possible to obtain particles having a composition conforming to that of the particles according to the invention.

Shapes other than those of the "beads" are possible according to the invention, but the approximately spherical shape is preferred. In the remainder of the description, reference is therefore made to beads, without this reference being limiting.

The fused beads according to the invention have very high fracture resistance and a very high wear resistance.

Without being tied to one theory, the inventors explain that this resistance is obtained by the improvement in the cohesion of the zirconia crystals with the glassy phase (silica glass) due to the MgO and $Al_2O_3$ additions, introduced in the amounts in question.

The fused ceramic beads according to the invention are particularly well suited as grinding agents and agents for dispersion in a wet medium, and also for surface treatment. The invention therefore also relates to the use of a plurality of particles, especially beads according to the invention, or beads manufactured following a process according to the invention, as grinding agents, agents for dispersion in a wet medium, or for surface treatment.

It should be noted however, that the properties of the beads, especially their resistance, their density, and also their ease of production, can make them suitable for other applications, especially as agents for dry grinding, for support and for heat exchange.

The following non-limiting examples are given for the purpose of illustrating the invention.

The following methods have been used to determine certain properties of various mixtures of fused ceramic beads. They enable an excellent simulation of the actual behaviour, in operation, in the grinding application.

To test the wear resistance of the beads, a horizontal pressurized mill with a 1.2 liter capacity was filled with 1 liter (apparent volume) of beads to be tested, namely a fill level of 83.3%. The stirrer members were formed from metal discs off-centred with respect to the axis of rotation and rotating at 2750 rpm, namely a peripheral disc speed of 10 m/s.

The suspension to be ground was a suspension of zirconia powder concentrated to 60% in water, namely 6 kg of powder per 4 kg of water. This suspension was transported through the mill by a peristaltic pump at a flow rate of 6 l/h. The duration of the test was 1.5 hours. Once the test was completed the beads were extracted from the mill, washed and dried.

After each test, the weight loss of the beads was determined by weighing. The wear of the beads was expressed as a percentage per hour of test (%/h) and was equal to the weight loss of the beads relative to the initial weight of the beads, the total divided by the test duration.

In order to test the fracture resistance of the beads, it is advisable to place them under extreme conditions which may result in fracture phenomena in a mill under normal operation.

A horizontal-type pressurized mill was equipped with fingers on the rotor and counter-fingers on the inside of the chamber. This mill, having a volume 1.2 liters, was charged with 50 vol % of beads of the planned particle size (apparent volume) which corresponded to an initial mass of beads $m_i$.

Before the mill began rotating and throughout the entire duration of the test, the chamber was supplied with water having a flow rate of 6 l/h. The rotational speed was set at 7.3 m/s for 30 minutes.

Once the test was finished, the beads were removed from the chamber, dried then sieved. All of the beads were sorted manually to remove the broken beads, which were then weighed. The weight of broken beads was equal to $m_{bb}$. The percentage of broken beads was equal to $100 \times m_{bb}/m_i$.

In the examples, for the starting feedstock, a composition based on zircon was used, and magnesium oxide and aluminium oxide were added. More specifically, a pulverulent composition composed of zircon sand was introduced into a Héroult type electric arc furnace. Several melting/casting cycles were carried while gradually adjusting the magnesium and aluminium oxides in the composition. The molten product was then dispersed into beads by blowing compressed air and isolated by casting.

This technique made it possible to have several lots of beads of different compositions that could be characterized according to methods well known to a person skilled in the art.

As the beads most likely to break during application were beads of size greater 1.6 mm, the tests described above were carried out on the particle-size faction from 1.6 to 2.5 mm.

The results obtained are summarized in Table 1 below.

TABLE 1

| Ex. | $ZrO_2$ + $HfO_2$ (%) | $SiO_2$ (%) | MgO (%) | $Al_2O_3$ (%) | MgO/ $Al_2O_3$ | Other oxides (%) | $m_i$ (g) | $m_{bb}$ (g) | % of broken beads | improvement in breakage relative to the reference (%) | Wear (%/h) |
|---|---|---|---|---|---|---|---|---|---|---|---|
| Ref. (*) | 67.9 | 30 | 0.01 | 1.86 | 0.01 | 0.23 | 1367.6 | 10.83 | 0.79 | — | 2.94 |
| 1 | 60.6 | 26.3 | 9.12 | 3.65 | 2.5 | 0.33 | 1352.6 | 11.9 | 0.88 | 11.39 | n.d. |
| 2 | 60.8 | 27 | 8.72 | 3.11 | 2.80 | 0.37 | 1355.3 | 9.08 | 0.67 | 15.19 | 1.80 |
| 3 | 61 | 28.2 | 7.93 | 2.42 | 3.28 | 0.45 | 1357.2 | 8.55 | 0.63 | 20.25 | 1.70 |
| 4 | 60.8 | 28.3 | 8.64 | 1.86 | 4.65 | 0.4 | 1348.7 | 3.53 | 0.26 | 67.09 | 1.60 |
| 5 | 61.2 | 28.5 | 8.58 | 1.44 | 5.96 | 0.28 | 1357.2 | 7.62 | 0.56 | 29.11 | n.d. |
| 6 | 61.7 | 28.2 | 8.41 | 1.29 | 6.52 | 0.4 | 1353.2 | 9.01 | 0.67 | 15.19 | 1.61 |
| 7 | 67.5 | 22.2 | 8.36 | 1.52 | 5.5 | 0.42 | 1351.7 | 6.35 | 0.47 | 40.5 | 1.80 |
| 8 (*) | 62.4 | 28.4 | 7.81 | 1.03 | 7.58 | 0.36 | 1345.7 | 14.6 | 1.08 | −36.7 | n.d. | n.d.: data not available;
(*) example outside the invention.

The reference beads outside the invention were beads commonly used in grinding applications.

The results were considered to be particularly satisfactory when the beads had:
- an improvement in the fracture resistance of at least 10% relative to that of the reference; and
- at the very least the same wear resistance as that of the reference.

The examples show that, surprisingly, values of the MgO/$Al_2O_3$ ratio between 2.4 and 6.6 give a clear improvement in the fracture resistance and also a significant improvement in the wear resistance relative to the reference beads. Outside of this range (reference, beads 8), the fracture resistance is clearly worse than that of the beads according to the invention.

The composition of the beads from Example 4 is the preferred composition of all. For the beads from Example 4, the wear measured as described previously is 1.60%/h whereas it is 2.94%/h for the reference beads.

Of course, the present invention is not limited to the embodiments described which are provided by way of illustrating and non-limiting examples.

The invention claimed is:

1. Fused ceramic particle having the following chemical composition, as weight percentages based on the oxides, and for a total of 100%:
   55% < $ZrO_2$+$HfO_2$ < 70%;
   20% < $SiO_2$ < 30%;
   6.5% < $MgO$ < 9.5%;
   $Al_2O_3$ in an amount such that the $MgO/Al_2O_3$ weight ratio is between 2.4 and 6.6; and
   less than 0.6% of other oxides.

2. Particle according to claim 1, in which the $ZrO_2$ content, as a weight percentage based on the oxides, is greater than or equal to 60%.

3. Particle according to claim 1, in which the $ZrO_2$ content, as a weight percentage based on the oxides, is less than or equal to 62%.

4. Particle according to claim 1, in which the $SiO_2$ content, as a weight percentage based on the oxides, is greater than or equal to 27%.

5. Particle according to claim 1, in which the $SiO_2$ content, as a weight percentage based on the oxides, is less than or equal to 29%, 6. Particle according to claim 1, in which the MgO content, as a weight percentage based on the oxides, is greater than or equal to 8%.

7. Particle according claim 1, in which the MgO content, as a weight percentage based on the oxides, is less than or equal to 9%.

8. Particle according to claim 1, in which the $MgO/Al_2O_3$ weight ratio is greater than or equal to 4.2.

9. Particle according to claim 1, in which the $MgO/Al_2O_3$ weight ratio is less than or equal to 5.

10. Particle according to claim 1, in which the content of "other oxides", as a weight percentage based on the oxides, is less than or equal to 0.5%.

11. Particle according to claim 1, in which the content of oxides represents more than 99.5% of the total weight of said particle.

12. Particle according to claim 1, having the following chemical composition, as weight percentages based on the oxides, and for a total of 100%:
    60% < $ZrO_2$+$HfO_2$ < 62%;
    27% < $SiO_2$ < 29%;
    8% < $MgO$ < 9%;
    $Al_2O_3$ in an amount such that the $MgO/Al_2O_3$ weight ratio is between 4.2 and 5; and
    less than 0.5% of other oxides.

13. Particle according to claim 1, having a sphericity greater than or equal to 0.6.

14. An agent fair grinding, dispersion in a wet medium, or surface treatment, comprising a plurality of particles according to claim 1.

* * * * *